(12) United States Patent
Hudson et al.

(10) Patent No.: US 11,667,326 B2
(45) Date of Patent: Jun. 6, 2023

(54) AUTOMATIC GUIDANCE PERFORMANCE IMPROVEMENT AND TRANSPORT WITH ARTICULATED MACHINE FORM

(71) Applicant: Deere & Company, Moline, IL (US)

(72) Inventors: Scott A. Hudson, Cedar Falls, IA (US); Nohoon Ki, Cedar Falls, IA (US); Jeffrey M. Tott, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 374 days.

(21) Appl. No.: 16/574,600

(22) Filed: Sep. 18, 2019

(65) Prior Publication Data

US 2021/0078630 A1 Mar. 18, 2021

(51) Int. Cl.
*B62D 6/00* (2006.01)
*B62D 12/00* (2006.01)

(52) U.S. Cl.
CPC .............. *B62D 6/00* (2013.01); *B62D 12/00* (2013.01)

(58) Field of Classification Search
CPC ............ B62D 6/00; B62D 12/00; B62D 9/00; B60W 30/10; B60W 40/072; B60W 40/10
See application file for complete search history.

(56) References Cited

U.S. PATENT DOCUMENTS

| | | | | |
|---|---|---|---|---|
| 3,771,241 A | * | 11/1973 | Lindell | .................. B62D 12/00 37/352 |
| 5,908,081 A | * | 6/1999 | Olson | ..................... B62D 7/02 180/419 |
| 6,266,596 B1 | * | 7/2001 | Hartman | ................ B60K 28/10 701/50 |
| 8,082,088 B2 | | 12/2011 | Olsson | |
| 8,639,416 B2 | * | 1/2014 | Jones | .................. A01B 69/007 701/41 |
| 9,380,737 B2 | * | 7/2016 | Bebernes | ............. B62D 5/0466 |
| 9,457,841 B2 | * | 10/2016 | Smith | ..................... F16H 61/44 |

(Continued)

FOREIGN PATENT DOCUMENTS

DE 102010021178 B3 11/2011
DE 112013000777 T5 10/2014

OTHER PUBLICATIONS

German Search Report issued in counterpart application No. 102020210178.7 dated Feb. 22, 2021 (10 pages).

*Primary Examiner* — Sze-Hon Kong
(74) *Attorney, Agent, or Firm* — Taft Stettinius & Hollister LLP; Stephen F. Rost (57) ABSTRACT

Operating a vehicle in an automated steering control mode wherein the vehicle includes a controller operatively coupled with an articulated steering system and a front axle steering system. The controller is configured to identify a desired path of curvature of the vehicle and determine a front axle steering angle of the front axle steering system and command the front axle steering system to operate at the front axle steering angle and also determine an articulation steering angle of the articulated steering system and command the articulated steering system to operate at the articulation steering angle. A further form includes operating front and rear ground engaging means at a designated speed, and thereafter operating the articulated steering system and the front axle steering system based on the designated speed being greater than a transport speed threshold, less than a field speed threshold or between the two.

11 Claims, 7 Drawing Sheets

(56) References Cited

U.S. PATENT DOCUMENTS

| | | | | |
|---|---|---|---|---|
| 10,599,151 | B1* | 3/2020 | Gunbatar | A01B 69/004 |
| 2005/0139412 | A1* | 6/2005 | Vigholm | B62D 6/02 |
| | | | | 180/418 |
| 2007/0219689 | A1* | 9/2007 | Gacioch | B62D 6/02 |
| | | | | 701/41 |
| 2008/0116000 | A1* | 5/2008 | Huang | B62D 6/02 |
| | | | | 180/235 |
| 2008/0208461 | A1* | 8/2008 | Gharsalli | G01C 21/32 |
| | | | | 701/425 |
| 2011/0035109 | A1* | 2/2011 | Ryerson | E02F 9/225 |
| | | | | 701/42 |
| 2013/0192919 | A1* | 8/2013 | Subrt | B62D 6/002 |
| | | | | 180/400 |
| 2015/0259881 | A1* | 9/2015 | Sharma | B62D 12/00 |
| | | | | 701/50 |
| 2015/0259882 | A1* | 9/2015 | Sharma | B62D 9/00 |
| | | | | 701/41 |
| 2016/0002885 | A1* | 1/2016 | Sharma | B62D 12/00 |
| | | | | 701/41 |
| 2016/0068186 | A1* | 3/2016 | Hellholm | B62D 55/0655 |
| | | | | 180/9.44 |
| 2016/0167647 | A1* | 6/2016 | Yamada | B60W 30/02 |
| | | | | 701/50 |
| 2017/0308091 | A1* | 10/2017 | Bunderson | A01B 79/005 |
| 2018/0346023 | A1 | 12/2018 | Oinonen | |
| 2019/0389519 | A1* | 12/2019 | Bergsten | A01B 59/067 |
| 2020/0086911 | A1* | 3/2020 | Stahl | B62D 5/005 |
| 2020/0359548 | A1* | 11/2020 | Benevelli | A01B 69/003 |

* cited by examiner

AUTOMATIC GUIDANCE PERFORMANCE IMPROVEMENT AND TRANSPORT WITH ARTICULATED MACHINE FORM

FIELD OF THE DISCLOSURE

The present disclosure relates to an articulated work vehicle, and in particular, an articulated work vehicle having steering control modes.

BACKGROUND OF THE DISCLOSURE

Work vehicles are configured to perform a wide variety of tasks for use such as construction vehicles, forestry vehicles, lawn maintenance vehicles, as well as on-road vehicles such as those used to plow snow, spread salt, or vehicles with towing capability. Additionally, work vehicles include agricultural vehicles, such as a tractor or a self-propelled combine-harvester, which include a prime mover that generates power to perform work. In the case of a tractor, for instance, the prime mover is often a diesel engine that generates power from a supply of diesel fuel. The diesel engine drives a transmission which moves wheels or treads to propel the tractor across a field.

Tractors generally include four or more wheels, in which two or more wheels sharing a common axle are located toward the front of the vehicle, and two or more wheels sharing a common axle are located toward the rear of the vehicle. Other configurations of axles are known and include tractors having two rear axles or tractors including a front axle, a middle axle and a rear axle.

Tractors of different types include front wheel drive, rear wheel drive, four wheel drive, or all-wheel drive systems. In addition, tractors of different types include a non-articulated frame such that the position of the front axle and the position of the rear axle cannot be adjusted along a longitudinal axis of the tractor. Other tractors include an articulated frame wherein the front axle is mounted to a front frame, the rear axle is mounted to a rear frame, and the front frame is rotatably coupled to the rear frame at a pivot location, such that the front frames and the rear frames are articulated with respect to one another. In some embodiments of an articulated tractor, the rotatable coupling can be locked to prevent articulation.

While articulated tractors provide a large amount of traction, and are often used for tilling crops or for pulling heavy loads, precise control of the articulated tractor can present certain problems due to the nature of steering adjustment. Consequently, what is needed is an articulating tractor having a steering system configured to provide for improved steering under one or more or all conditions, including improving automatic guidance performance to prevent harsh switching between an articulated steering system and a front axle steering system to minimize guidance errors and reduce or eliminate steering oscillations, improving operator steering of the tractor while operating the tractor at field and transport speeds, and improving operator steering of the tractor while operating the tractor at a speed between field and transport speed to prevent harsh switching between the articulated steering system and the front axle steering system while maximizing vehicle maneuverability.

SUMMARY

The present disclosure may comprise one or more of the following features and combinations thereof.

According to one embodiment of the present disclosure, a method for steering a vehicle, the method comprising: operating the vehicle in an automated steering control mode wherein the vehicle includes an articulated steering system, a front axle steering system, and a controller operatively coupled with the articulated steering system and the front axle steering system, wherein the controller is configured to identify a desired path curvature of the vehicle, based on the desired path curvature of the vehicle, determine a front axle steering angle of the front axle steering system and command the front axle steering system to operate at the front axle steering angle; and based on the desired path curvature of the vehicle, determine an articulation steering angle of the articulated steering system and command the articulated steering system to operate at the articulation steering angle.

In a further embodiment, wherein a desired steering angle is determined from the desired path curvature of the vehicle. In a further refinement of that embodiment, when the desired steering angle is less than an articulation steering actuation angle, operating the articulated steering system in a fixed configuration. In yet a further refinement of that embodiment, wherein the vehicle includes front and rear ground engaging means; and operating at least one of the front ground engaging means and the rear ground engaging means at a transport speed. In a further refinement of that embodiment, when the desired steering angle is greater than an articulation steering actuation angle, operating the articulated steering system at the articulation steering angle being at least equal to the articulation steering actuation angle.

In a further embodiment, when the front axle steering angle is equal to a front axle steering stop angle, then operating the front axle steering system in a maximum turning configuration.

In a further embodiment, when the front axle steering angle is between the front axle steering stop angle and the articulation steering actuation angle, operating the articulated steering system at the articulation steering angle greater than zero degrees.

In a further embodiment, wherein the sum of the front axle steering angle and the articulation steering angle is equal to the desired steering angle.

According to yet another embodiment of the present disclosure, a method of steering a vehicle, comprising: operating the vehicle in an automated steering control mode wherein the vehicle includes an articulated steering system, a front axle steering system, and a controller operatively coupled with the articulated steering system and the front axle steering system; commanding the vehicle to operate at a desired path curvature of the vehicle; determining a front axle steering angle and an articulation steering angle from the desired path curvature; operating the front axle steering system at the front axle steering angle; and operating the articulated steering system at the articulation steering angle.

In a further embodiment, wherein a desired steering angle is determined from the desired path curvature of the vehicle. In a further refinement of that embodiment, wherein while the desired steering angle is less than an articulation steering actuation angle, the operating the articulated steering system includes limiting operation of the articulated steering system to a designated articulated steering angle. In a further refinement of that embodiment, wherein the vehicle includes front and rear ground engaging means; and operating at least one of the front ground engaging means and the rear ground engaging means at a transport speed.

In a further embodiment, wherein while the desired steering angle is greater than an articulation steering actuation angle, the operating the articulated steering system includes the articulation steering angle being at least equal to the articulation steering actuation angle.

In a further embodiment, wherein while the front axle steering angle is equal to a front axle steering stop angle, the operating the front axle steering system includes operating the front axle steering system in a maximum turning configuration.

In a further embodiment, further comprising when the front axle steering angle is between a front axle steering stop angle and an articulation steering actuation angle, the operating the articulated steering system includes the articulation steering angle being greater than zero degrees.

According to yet another embodiment of the present disclosure, a method for steering a vehicle comprising: operating the vehicle in an automated steering control mode wherein the vehicle includes a controller operatively coupled with an articulated steering system, a front axle steering system, and front and rear ground engaging means; commanding at least one of the front ground engaging means and the rear ground engaging means to operate at a designated speed; determining if the designated speed is greater than a transport speed threshold then enabling operation of the front axle steering system at a front axle steering angle; and while the designated speed is greater than the transport speed threshold, limiting operation of the articulated steering system at a designated articulated steering angle.

In a further embodiment, further comprising determining if the designated speed is less than a field speed threshold, then enabling operation of the articulated steering system at any articulation steering angle and enabling operation of the front axle steering system at any front axle steering angle. In a further refinement of this embodiment, further comprising limiting operation of the front axle steering angle to a front axle steering stop angle.

In a further embodiment, determining if the designated speed is between a field speed threshold and the transport speed threshold, then enabling operation of the articulated steering system at the articulation steering angle that is linearly interpolated between an articulation angle limit and zero degrees.

In a further embodiment, enabling operation of the front steering system at the front axle steering angle at a first rate of adjustment; and enabling operation of the articulated steering system at the articulation steering angle at a second rate of adjustment, wherein the first and second rate of adjustments may be different.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

Corresponding reference numerals are used to indicate corresponding parts throughout the several views. The exemplifications set out herein illustrate embodiments of the invention, and such exemplifications are not to be construed as limiting the scope of the invention in any manner.

DETAILED DESCRIPTION

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

Figure 1:
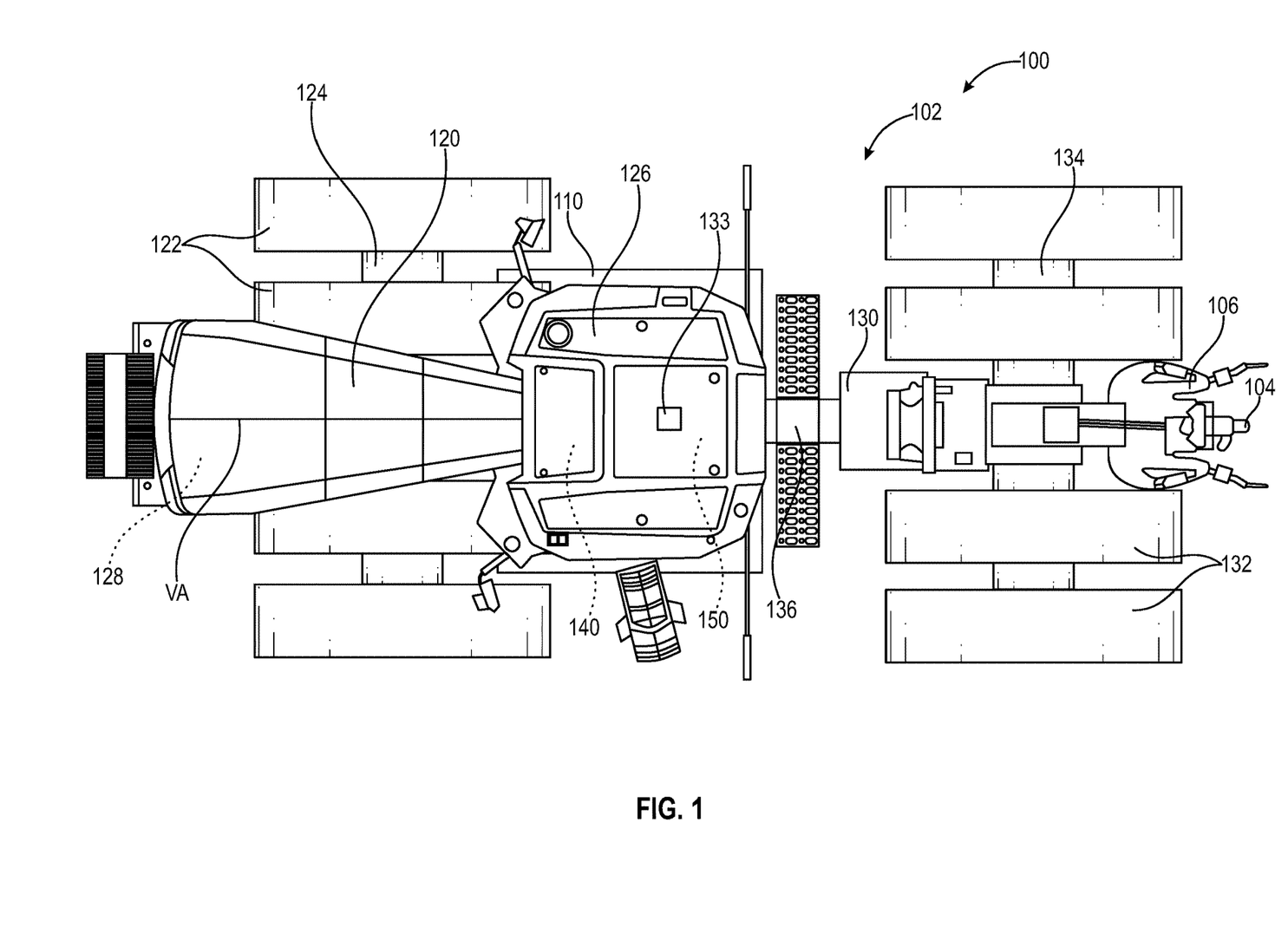
FIG. 1 is a top view of an agricultural vehicle that includes a front section coupled to front wheels and a rear articulation section coupled to rear wheels and pivotally coupled to the front section.

Referring now to FIG. 1, an agricultural vehicle 100 is embodied as, or otherwise includes, a tractor 102 that is configured to tow, pull, or otherwise drive movement of, one or more work implements (not shown) which may be attached thereto. The tractor 102 includes an implement attachment interface 104 to attach the one or more work implements at a rear end 106 of the tractor 102. It should be appreciated that in some embodiments, the implement attachment interface 104 may be embodied as, or otherwise include, a hitch, a drawbar, or the like.

In some embodiments, the illustrative tractor 102 may be embodied as, or otherwise include, any one of a number of tractors manufactured by John Deere. For example, the tractor 102 may be embodied as, or otherwise include, any one of the following: a series 9570R Tractor, a series 9620R Tractor, a series 9470RT Tractor, a series 9520RT Tractor, a series 9570RT Tractor, a series 9420RX Tractor, a series 9470RX Tractor, a series 9520RX Tractor, a series 9570RX Tractor, or a series 9620RX Tractor. Of course, in other embodiments, it should be appreciated that the tractor 102 may be embodied as, or otherwise include, any other suitable tractor or agricultural vehicle.

It should be appreciated that the tractor 102 may be embodied as, or otherwise include, equipment used in one or more of a variety of applications. In the illustrative embodiment, the tractor 102 is adapted for use in one or more agricultural applications as indicated above. In other embodiments, however, the tractor 102 may be embodied as, included in, or otherwise adapted for use with, equipment used in lawn and garden, construction, landscaping and ground care, golf and sports turf, forestry, engine and drivetrain, or government and military applications, for example. In such embodiments, the vehicle 100 of the present disclosure may be included in, or otherwise adapted for use with, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, or marine engines, among other suitable equipment.

The illustrative tractor 102 includes a frame structure 110, a front section 120, and a rear articulation section 130. The frame structure 110 may include, or otherwise be embodied as, a main frame or main chassis of the tractor 102. The front section 120 is coupled to the frame structure 110 and includes front wheels 122 that are supported for movement on a front axle 124. The front section 120 includes an operator cab 126 in which various operational controls for the tractor 102 are provided, as described in greater detail below. The rear articulation section 130 is coupled to the frame structure 110 and to rear wheels 132 that are supported for movement on a rear axle 134. The rear articulation section 130 is pivotally coupled to the front section 120 via an articulation joint 136 and arranged opposite the front section 120 along a vehicle axis VA. The articulation joint 136 is located at a zero (0) degree inclination, such that the tractor 102 moving in either a forward direction or a rearward direction, moves along a straight line path upon a relatively flat, even, and level surface. Because the rear articulation section 130 is configured for pivotal movement relative to the front section 120 as will be apparent from the discussion that follows, the vehicle 100 may be referred to as an articulated vehicle 100.

In the illustrative embodiment, the front section 120 includes a drive unit or engine 128 that is configured to supply driving power to one or more driven components of the tractor 102. The drive unit 128 is embodied as, or otherwise includes, any device capable of supplying rotational power to driven components of the tractor 102 to drive those components. In some embodiments, rotational power supplied by the drive unit 128 may be provided to the driven components of the tractor 102 by one or more transmission(s). In one example, the drive unit 128 may be configured to supply power to one or more transmission(s) that is/are coupled to the front wheels 122 and/or the rear wheels 132 and operable to provide various predetermined speed ratios selectable by an operator in reverse and forward operating modes. Additionally, in some embodiments, the drive unit 128 may be coupled to a pump or generator to provide hydraulic, pneumatic, or electrical power to one or more components of the tractor 102, as the case may be.

The illustrative tractor 102 includes a front axle steering system 140 associated with the front section 120 and a rear articulation section steering system 150 associated with the rear articulation section 130. The front axle steering system 140 is embodied as, or otherwise includes, a collection of devices that are cooperatively configured to adjust the position and/or angular orientation of the front wheels 122 and the front axle 124 and thereby steer those components during operation of the tractor 102 in response to operating the tractor 102 in an automated steering control mode, which may be provided via a front section steering wheel (not shown) located in the operator cab 126, for example. Alternatively, the front axle steering system 140 is operable in response to a steering input provided by an operator. Similarly, the rear articulation section steering system 150 is embodied as, or otherwise includes, a collection of devices that are cooperatively configured to adjust the position and/or angular orientation of the rear wheels 132 and the rear axle 134 and thereby steer those components during operation of the tractor 102 in response to operating the tractor 102 in an automated steering control mode, which may be provided via a rear articulation section steering wheel (not shown) located in the operator cab 126. Alternatively, the rear articulation section steering system 150 is operable in response to a steering input provided by an operator. It should be appreciated that each of the steering systems 140, 150 may include, or otherwise be embodied as, one or more linkages, racks, pinions, bars, brackets, rods, gears, pulleys, sprockets, wheels, bearings, shafts, chains, belts, axles, actuators, valves, tracks, differentials, or the like which are cooperatively configured to steer the wheels 122, 132 and the corresponding axles 124, 134 based on the automated steering control mode.

Figure 2:
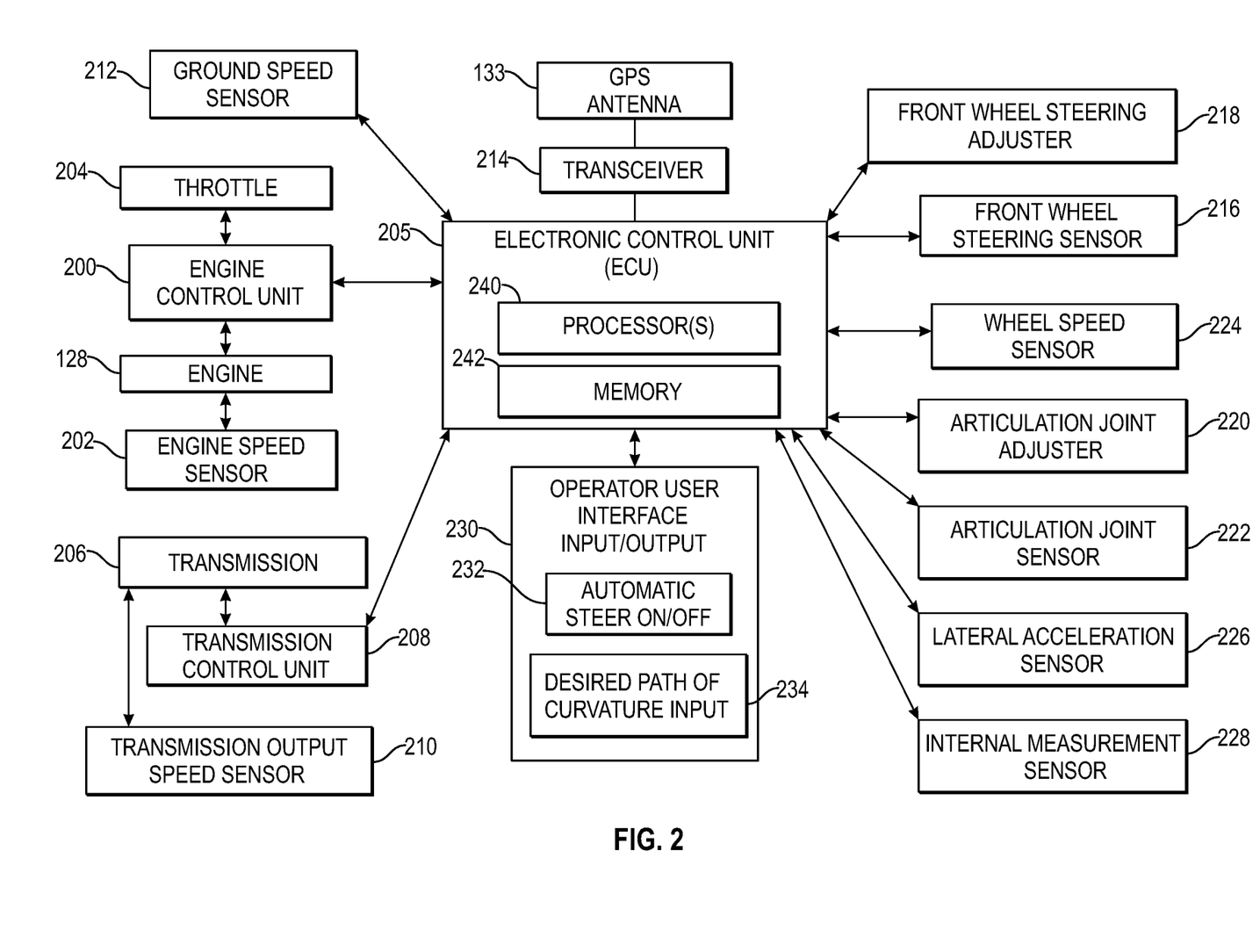
FIG. 2 is a control system block diagram for the vehicle shown in FIG. 1.

As further illustrated in FIG. 2, the tractor 102 includes the engine 128 which is operatively connected to an engine control unit 200, which in one embodiment is operatively connected to an engine speed sensor 202 configured to determine the speed of the engine 128. A throttle 204 is operatively connected to the engine control unit 200 to adjust the speed of the engine, and therefore the vehicle speed as would be understood by one skilled in the art. In another embodiment, the throttle 204 is additionally a machine controlled throttle which is automatically controlled by an electronic control unit (ECU) 205, also known as a controller, in response to vehicle speed information. The engine control unit 200 is operatively connected to the ECU 205, which is located in the cab 126 or at other locations within the tractor 102. The ECU 205 is configured to receive and to process vehicle information received from the engine control unit 200.

A transmission 206 is operatively connected to the front wheels 122 and to the rear wheels 132 to move the vehicle in a forward or a reverse direction. A transmission control unit 208 is operatively connected to the ECU 205. A transmission output speed sensor 210 is operatively connected to the transmission 206 and is configured to determine the output speed of the transmission 206. The output speed of the transmission 206 determines the rotational speed of the wheels, and therefore the speed of the tractor 102.

In addition to the engine speed sensor 202 and the transmission output speed sensor 210, other vehicle environment sensors are operatively connected to the ECU 205 to monitor the operating conditions of the vehicle. A ground speed sensor 212 is operatively connected to the ECU 205 to provide the ground speed of the tractor 102 as it moves in the forward or in a reverse direction. In one embodiment, the ground speed sensor 212 is a radar unit connected to the vehicle and is configured to provide a radar signal to the ECU 205 for determining speed. In another embodiment, a ground speed signal is provided by the GPS antenna 133 through a receiver or transceiver 214 configured to communicate with the global positioning system as is understood by those skilled in the art.

Additional vehicle environment sensors are used by the vehicle or tractor 102 to control the forward and the rearward movement of the vehicle either in a straight line path or in a curved line path, such as when the vehicle is turning at the end of rows in a field. A front wheel steering sensor 216 is operatively connected to the ECU 205 and is configured to transmit a front axle steering angle of the front wheels. The front wheel steering sensor 216, in one embodiment, is located at a steering gearbox of a front wheel steering assembly 140. Other locations of the front wheel steering sensor 216 are contemplated including at a front wheel steering adjuster 218 configured to move the front wheels 122 in the desired direction. In one embodiment, the front wheel steering adjuster 218 is a steering wheel. In another embodiment, the front wheel steering adjuster 218 is included as a feature of the ECU 205 which automatically adjusts the direction of the front wheels 122 as describe herein. In still another embodiment, the front wheel steering adjuster 218 commands the direction of the front wheels in response to signals received from the global positioning system.

The vehicle or tractor 102 further includes an articulation joint adjuster 220, or articulator, which is configured to adjust the position of the rear articulation section 130 with respect to the front section 120 in response to one or more of the steering wheel, the front wheel adjuster 218, and signals received from the electronic control unit 205 generated in response to directional signals. An articulation joint sensor 222 is located at one or more locations on the vehicle or tractor 102. In one embodiment, the articulation joint sensor 222 is located at the articulation joint 136 and is configured to determine an amount of pivot or an articulation steering angle at the articulation joint 136. In one embodiment, the articulation joint sensor 222 determines a mechanical position between a fixed part of one of the frames and a corresponding movable part that pivots about the fixed part. In another embodiment, the articulation joint sensor 222 is configured as a portion of the ECU 205 and determines the position of the rear articulation section 130 with respect to the front section 120 based on the signal being transmitted to the articulation joint adjuster 220. In one embodiment, the articulator 220 includes a first and a second hydraulic cylinder each of which is coupled the front section 120 and the rear articulation section 130 at the articulation joint 136. Actuation control of each of the first and second cylinders by the controller 205 adjusts the position of the rear articulation section 130 with respect to the front section 120. Other types of articulators 220 are contemplated.

Additional vehicle environment sensors include, but are not limited to, a wheel speed sensor 224, a lateral acceleration sensor 226, and an inertial measurement sensor 228. The wheel speed sensor 224, in different embodiments, is located at one or more of the wheels 122 and 132 and determines a speed of the wheel with respect to a fixed part of the vehicle or tractor 102, such as the supporting axle. The wheel speed sensor 224 is configured to transmit a wheel speed signal to the ECU 205 that includes rotational speed information of the wheel when the wheels are providing traction or when the wheels are slipping or spinning. The ECU 205 is configured to determine when the wheels are losing traction, slipping, or spinning, by comparing the wheel speed to the ground speed signal generated by the ground speed sensor 212. The ECU 205 is configured to determine a transport speed or a field speed that is operable in a field condition with or without crops being planted of the one or more of the wheels 122 and 132, as described in more detail below.

The lateral acceleration sensor 222 is operatively connected to the vehicle in one or more locations either at the front section 120 or the rear articulation section 130. The lateral acceleration sensor 222, in one or more embodiments, includes a lateral accelerometer device or a sensor that measures yaw rate. In one embodiment the wheel speed sensor 222 includes two or more lateral acceleration sensors, where at least one of the sensors 222 is located at the front section 120 and another one of the sensors is located at the rear articulation section 130. The inertial measurement sensor 228, in different embodiments, determines lateral acceleration of the vehicle or tractor 102, either alone or in combination with the lateral acceleration sensor 222. In different embodiments, the inertial measurement sensor 228 includes, an accelerometer, a gyroscope, a magnetometer, or a combination thereof.

The vehicle or tractor 102 further includes the operator user interface 230 that is operatively connected to the ECU 205. The user interface 230 includes various user input and/or outputs for determining and/or displaying vehicle status. The user interface 230 further includes one or more control mode inputs configured to control steering of the articulated vehicle for predetermined steering conditions. An automatic steering on and off control device 232 is configured to enable a user to set the vehicle in an automatic or automated steering mode or in a manual steering mode in which the operator controls steering of the vehicle. When the automatic steering is turned on, a desired path curvature of the tractor 102 is determined by the ECU 205 based on information stored in the memory 242, or based on information received through the GPS antenna 133, or the front wheel sensor 216 and the articulation joint sensor 222. In another embodiment, the user interface 230 includes a desired path of curvature input 234 which enables the user to select a desired path of curvature of the tractor 102 and determine a desired steering angle. The desired path of curvature input 234 is converted to a desired steering angle which is then utilized to determine the articulation steering angle and the front axle steering angle as described in more detail below.

The ECU 205, in different embodiments, includes a computer, computer system, or other programmable devices. In other embodiments, the ECU 205 can include one or more processors 240 (e.g. microprocessors), and an associated memory 242, which can be internal to the processor or external to the processor 240. The memory 242 can include random access memory (RAM) devices comprising the memory storage of the ECU 205, as well as any other types of memory, e.g., cache memories, non-volatile or backup memories, programmable memories, flash memories, and read-only memories. In addition, the memory in different embodiments includes a memory storage physically located elsewhere from the processing devices, including any cache memory in a processing device, as well as any storage capacity used as a virtual memory, e.g., as stored on a mass storage device or another computer coupled to ECU 205. The mass storage device can include a cache or other dataspace which can include databases. Memory storage, in other embodiments, is located in the "cloud", where the memory is located at a distant location which provides the stored information wirelessly to the ECU 205. When referring to the ECU 205 and the memory 242 in this disclosure other types of controllers and other types of memory are contemplated.

The ECU 205 executes or otherwise relies upon computer software applications, components, programs, objects, modules, or data structures, etc. Software routines resident in the included memory of the ECU 205, or other memory, are executed in response to the signals received from the sensors as well as signals received from the engine control unit 205, the transmission control unit 208, the ground speed sensor 212, and the GPS antenna 133. The ECU 205 also relies on computer software applications to adjust the front wheel steering operation as well as adjust the articulation joint steering operation. The computer software applications, in other embodiments, are located in the cloud. The executed software includes one or more specific applications, components, programs, objects, modules or sequences of instructions typically referred to as "program code". The program code includes one or more instructions located in memory and other storage devices which execute the instructions which are resident in memory, which are responsive to other instructions generated by the system, or which are provided a user interface operated by the user.

The operator of the articulated vehicle or tractor 102 is provided with steering control modes available at the user interface 130 while farming, during transport, and at various speeds. The angle of the steerable front wheels 122 and the angle of the rear articulation section 130 with respect to the front section 120 are both adjustable. The front axle steering angle of the front wheels 122 is adjustable without adjustment of the articulation steering angle or the front axle steering angle is adjustable in combination with adjustment of the articulation steering angle.

Figure 4:
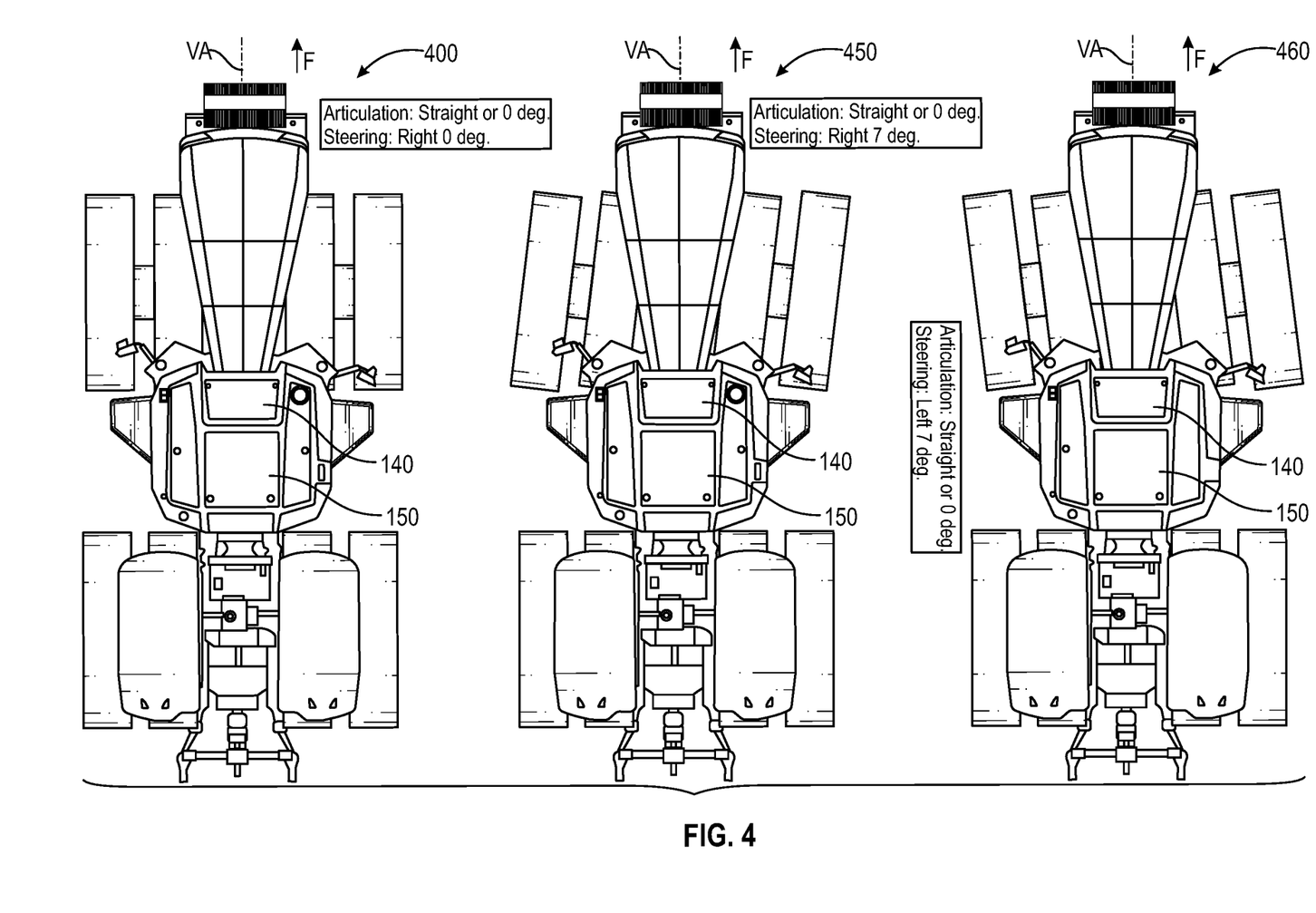
FIG. 4 is a top view of the agricultural vehicle of FIG. 1 depicted in a forward operating mode in which steering of the front wheels and the rear wheels may be performed.

In one embodiment of the automatic mode, during field operation of the tractor 102 in a forward direction "F" as illustrated in FIG. 4, the articulation section steering system 150 is commanded to operate at an articulation steering angle and the front axle steering system 140 is commanded to operate at the front axle steering angle based on the desired path curvature input 234. This enables the tractor 102 to hold a more accurate line of travel path which eliminates the typical "S-ing" guidance behavior of an articulated machine form. In FIG. 4, the tractor 102 is depicted in a baseline orientation 400 in which the wheels 122, 132 extend along, and are oriented substantially parallel to, the vehicle axis VA. For the purposes of the present disclosure, in the baseline orientation 402 of the tractor 102, each of the wheels 122, 132 is oriented at an angle of zero degrees, or an angle substantially close to zero degrees, relative to the vehicle axis VA. It should be appreciated that other orientations of the wheels 122, 132 are described below with reference to the vehicle axis VA.

Figure 3:
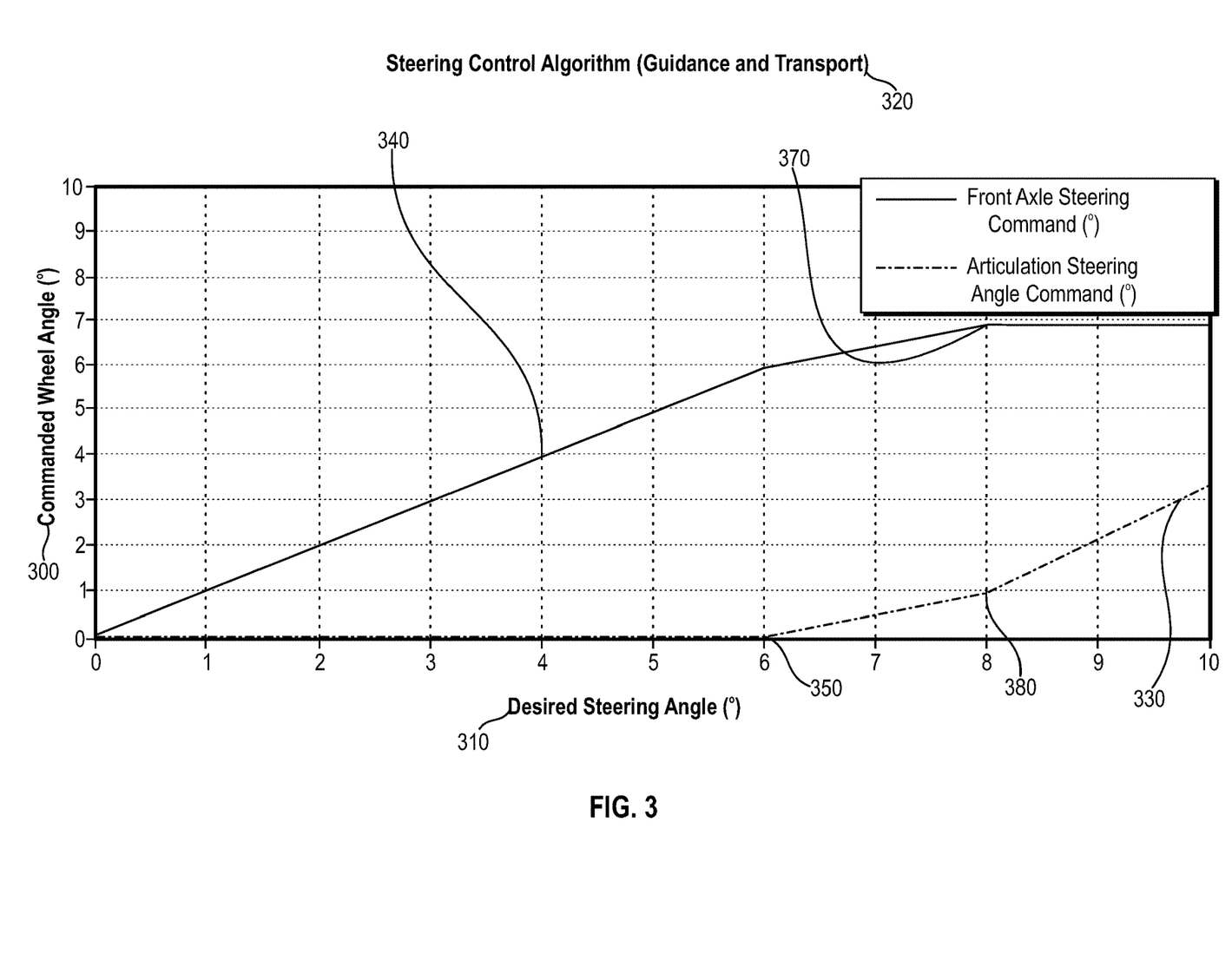
FIG. 3 is a graphical representation corresponding to the forward operating mode depicted in FIG. 4.

Turning to FIG. 3, is a graphical representation of a commanded wheel angle 300 (i.e., with respect to the vehicle axis VA) are plotted relative to a desired steering angle 310 (i.e., with respect to the vehicle axis VA) in a field and/or guidance transport mode 320. A commanded articulation steering angle 330 is plotted relative to the desired steering angle 310 and the commanded wheel angle 300. A commanded front axle steering angle 340 is plotted relative to the desired steering angle 310 and the commanded wheel angle 300. The field and/or guidance transport mode 320 is a system and method for improving automatic guidance performance for articulated vehicles such as tractor 102. In the automated steering control mode, the articulation steering system 150 is commanded to a fixed angle based on the desired path of curvature input 234. For a straight track operation in which the front axle steering angle and the rear articulation steering angle are both 0 degrees, the path curvature is 0 degrees, as illustrated in FIG. 4 as straight track or baseline operation 400. As illustrated in FIG. 3, the front axle steering system 140 is exclusively used to make corrections unless the path curvature exceeds its end-of-travel stop. The operator enters the desired path of curvature input 234 (1/radius), which is converted to the desired steering angle in degrees based on the steering system geometry. The ECU 205 splits the desired steering angle into a front axle steering angle command and an articulation steering angle command using FIG. 3 or another desired input.

In FIG. 3, the front axle steering system 140 has a maximum travel limit that corresponds to operating the front axle steering angle equal to a front axle steering stop angle or a maximum turning configuration. In one form, the front axle steering stop angle is limited to ±7° relative to the vehicle axis VA as illustrated in FIG. 4 as maximum right turn configuration 450 and maximum left turn configuration 460 wherein each of the front wheels 122 is oriented at an angle of 7 degrees relative to the vehicle axis VA. In other types of vehicles the front axle steering stop angle is limited to a higher or lower angle. In either of maximum turning configurations 450 and 460, the path curvature is 0 degrees.

Returning to FIG. 3, the sum of the commanded front axle steering angle 340 and the commanded articulation steering angle 330 equals the desired steering angle 310. To prevent harsh switching between the front axle steering system 140 and the rear articulated steering system 150, a 1° overlap is added between 6 and 8° of the desired steering angle 310. In other embodiments or other types of vehicles, this overlap in degrees may be smaller or larger. By primarily using the front axle steering system 140 for smaller or lower desired steering angle 310, guidance errors are minimized and the typical steering oscillations present in articulated steering system 150 are significantly reduced. In particular, when the desired steering angle 310 is less than an articulation steering actuation angle 350, the articulated steering system 150 is operated in a fixed configuration that corresponds to the commanded articulation steering angle 330 being zero degrees relative to the vehicle axis VA. There will not be any adjustments of the articulation steering system 150 but only the front steering system 140 is adjusted.

If desired path curvature is a sharp curve then the articulation steering system 150 is commanded to an angle based on this sharp curve. When the desired steering angle 310 is greater than the articulation steering actuation angle 350, then the articulated steering system 150 is commanded to operate at the articulation steering angle being at least equal to the articulation steering actuation angle 350. When the commanded front axle steering angle 340 is equal to a front axle steering stop angle 370, then the front axle steering system 140 is operated in a maximum turning configuration. In the illustrated chart in FIG. 3, the maximum turning configuration or maximum turning angle for the front axle steering system 140 is 7 degrees as illustrated in FIG. 4 as maximum right turn configuration 450 and maximum left turn configuration 460. When the commanded front axle steering angle 340 is between the front axle steering stop angle 370 and the articulation steering actuation angle 350, the articulated steering system 150 is operated at the articulation steering angle greater than zero degrees but less than 1 degrees. When the desired steering angle 310 is greater than the combination of the front axle steering stop angle 370 and an articulation actuation angle 380, then the front steering system 140 is operated in the front axle steering stop angle 370 and the rear articulation steering system 150 is operated at the articulation steering angle that is greater than the articulation actuation angle 380.

Figure 5:
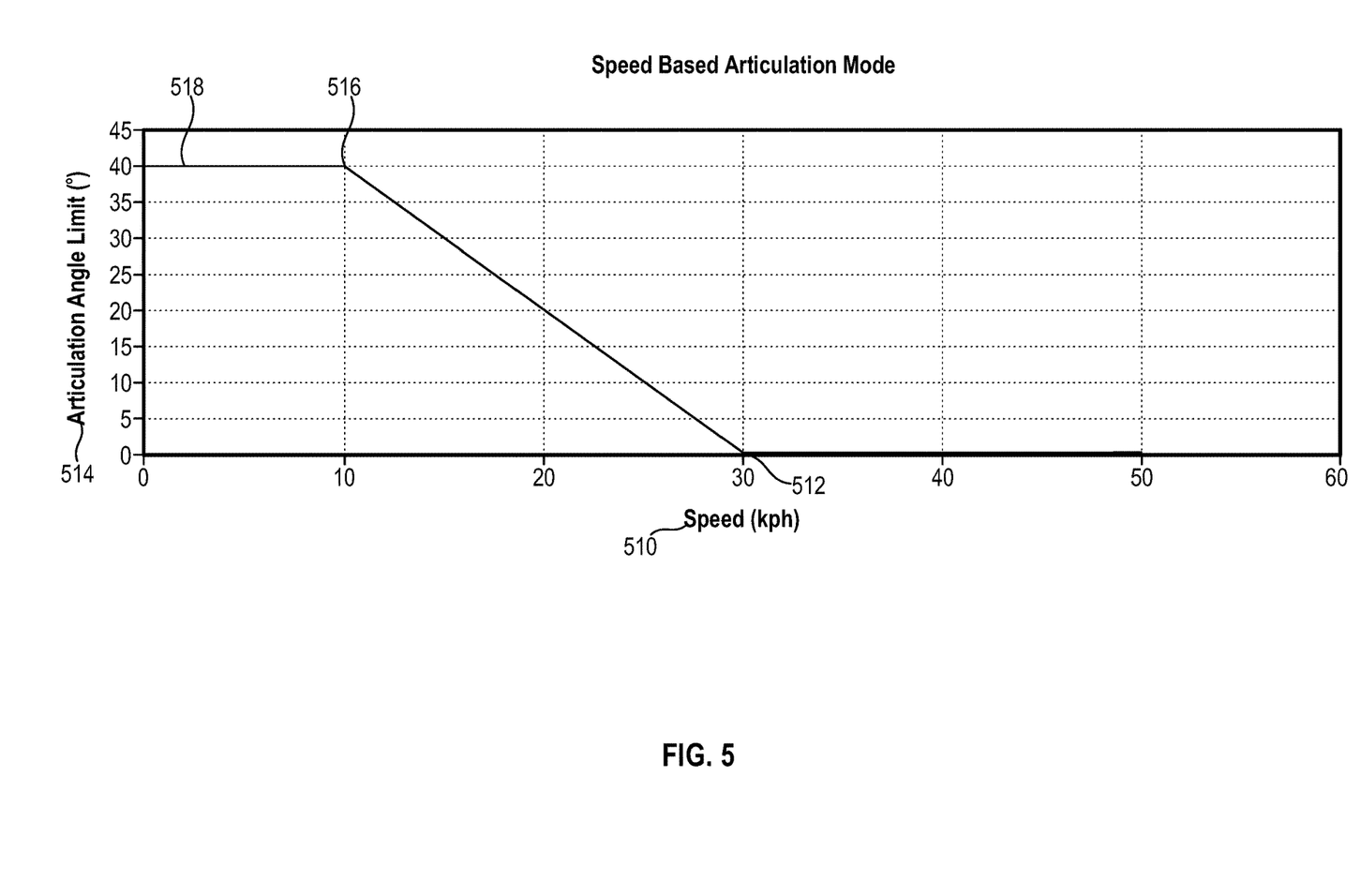
FIG. 5 is a graphical representation corresponding to a speed based articulation mode depicted in FIG. 7.

Turning now to FIGS. 3, 5, 6, and 7 is a system and method for improving operator steering performance for the tractor 102 at transport and field operating conditions. The system and method is speed dependent to enable or disable operation of the front axle steering system 140 and/or the articulated steering system 150. As illustrated in FIG. 5, when a designated speed 510 of the tractor 102 is greater than a transport speed threshold 512, the operation of the articulated steering system 150 is limited to a designated articulated steering angle 514. The designated speed 510 of the tractor 102 is determined by commanding at least one of the front ground engaging means or wheels 122 and the rear ground engaging means or wheels 132 to operate at the designated speed 510. In one non-limiting example, illustrated in FIG. 5, when the designated speed 510 is greater than the transport speed threshold 512 of 30 kph, then the designated articulated steering angle 514 is limited to 0 degrees. In other embodiments, the transport speed threshold 512 can be a larger or smaller number. In this configuration, the articulated steering system 150 is electronically locked out (i.e., fixed to straight), improving both operator comfort and vehicle handling. At transport speeds greater than or equal to the transport speed threshold 512, the designated articulated steering angle 514 is limited to 0° (straight) while the front axle steering system 140 end-of-travel limit has not been reached. As such, the front axle steering system 140 is operated at a front axle steering angle as illustrated in FIG. 3 and discussed above.

Figure 6:
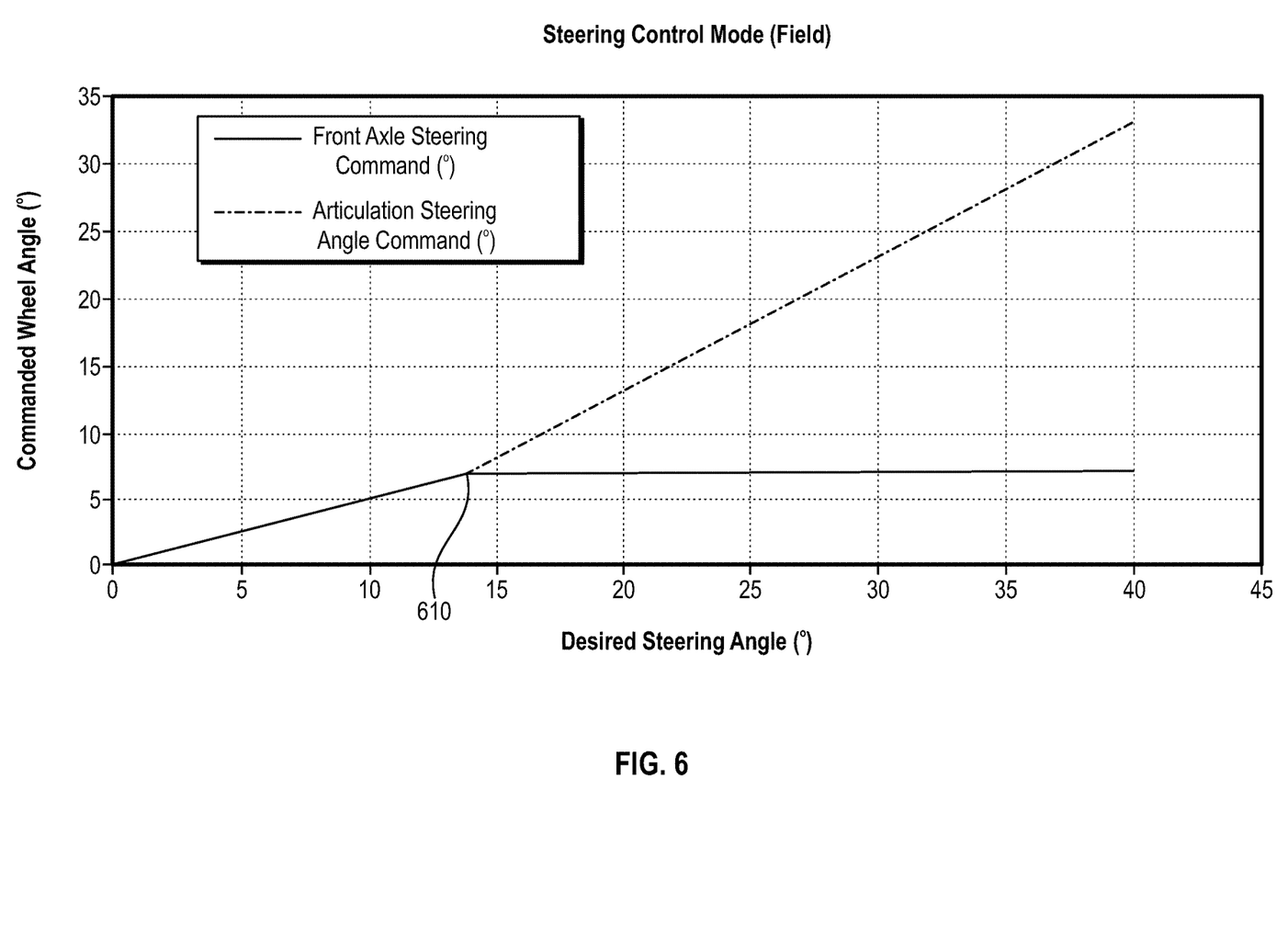
FIG. 6 is a graphical representation corresponding to a steering control mode in a field operating condition depicted in FIG. 7.

As illustrated in FIGS. 5 and 6, if the designated speed 510 is less than a field speed threshold 516, then the articulated steering system 150 is enabled to operate at any articulation steering angle upto a maximum designated articulation steering angle 518 and the front axle steering system 140 is enabled to operate at any front axle steering angle up to a front axle steering stop angle 610. Effectively both the articulated steering system 150 and the front axle steering system 140 are effectively limited by the embodiment illustrated in FIG. 6.

In the illustrated embodiment of FIG. 5, if the designated speed 510 is less than a field speed threshold 516, the articulation angle is effectively unlimited and the operator can use the full range of the articulated steering system 150. In one form, the field speed threshold 516 is less than 10 kph however in other embodiments the field speed threshold 516 may be a different value. Typically, an operator uses the articulated steering system 150 more at slower transport speeds, proportionally, for maximum maneuverability.

In the illustrated embodiment in FIG. 5, when the designated speed 510 is between the field speed threshold 516 and the transport speed threshold 512, the articulation angle limit 514 is linearly interpolated to prevent harsh switching between articulated steering system 150 and the front axle steering system 140 while maximizing vehicle maneuverability. For example, blending of articulation steering system 150 with front axle steering system 140 for cornering and right-angle or greater turns would occur when the designated speed 510 is between the field speed threshold 516 and the transport speed threshold 512. If the desired speed 510 is varied, the desired steering angle is unchanged. The front axle steering system 140 and the articulation steering system 150 may be commanded to different angles without input from the operator, but the tractor 102 must maintain its path curvature. Similarly, if the front axle steering system 140 and the articulation steering system 150 are out of synchronization, the tractor 102 must maintain its path curvature, however the front axle steering system 140 and the articulation steering system 150 can be adjusted at different rates for resynchronization. For example, if the designated speed 510 is between the field speed threshold 516 and the transport speed threshold 512, then the articulated steering system 150 is enabled to operate at the articulation steering angle that is linearly interpolated between an articulation angle limit and zero degrees. Further, the front axle steering system 140 is operated at the front axle steering angle being at a first rate of adjustment and the articulated steering system 150 is operated at the articulation steering angle at a second rate of adjustment, wherein the first and second rate of adjustments may be different.

Figure 7:
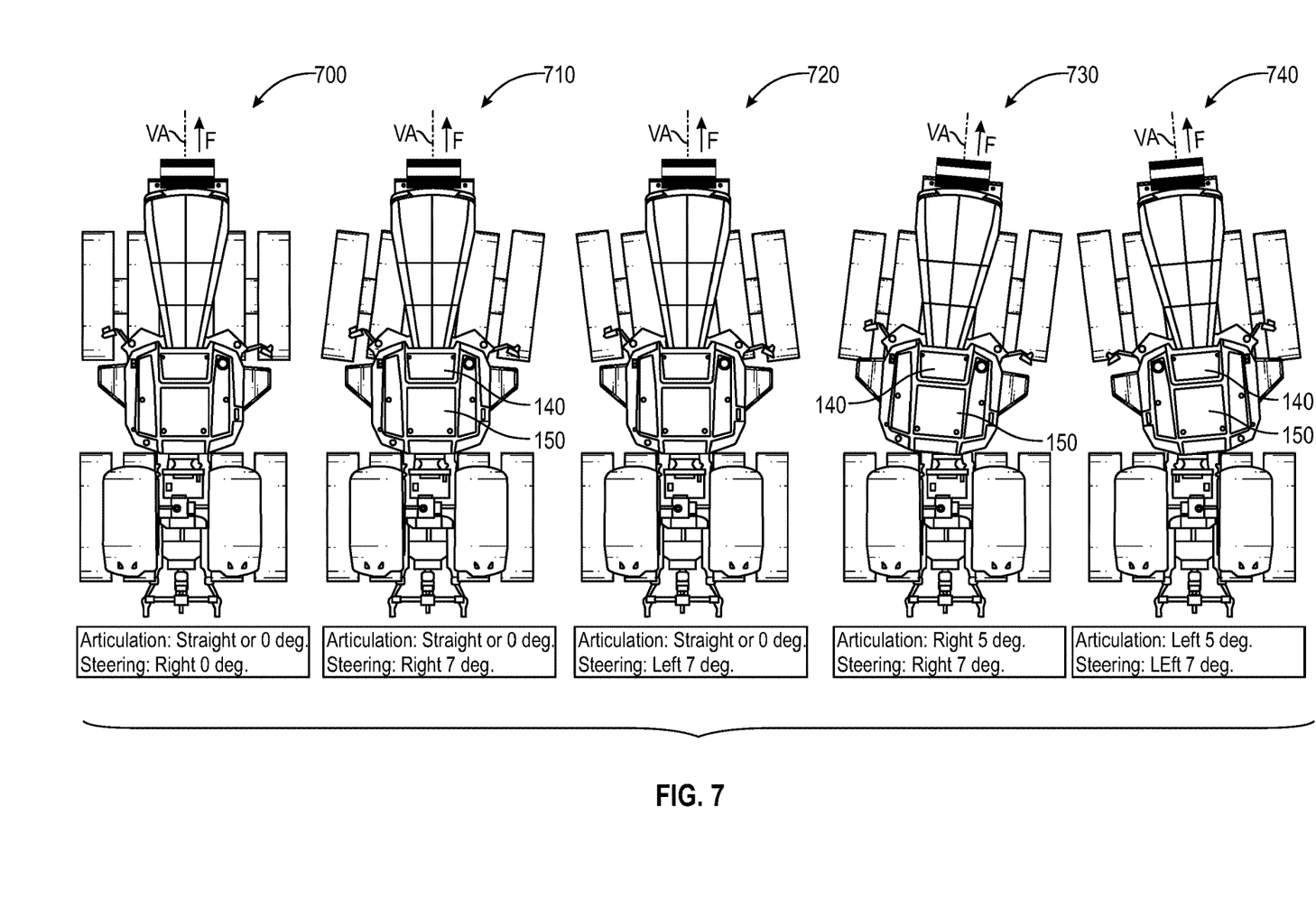
FIG. 7 is a top view of the agricultural vehicle of FIG. 1 depicted in a forward operating mode in which steering of the front wheels and the rear wheels may be performed.

FIG. 7 illustrates how the front axle steering system 140 and the articulated steering system 150 operate. In one form, the tractor 102 is depicted in a baseline orientation 700 in which the wheels 122, 132 extend along, and are oriented substantially parallel to, the vehicle axis VA. For the purposes of the present disclosure, in the baseline orientation 700 of the tractor 102, each of the wheels 122, 132 is oriented at an angle of zero degrees, or an angle substantially close to zero degrees, relative to the vehicle axis VA. In one form, when the tractor 102 is in a right transport orientation 710 or a left transport orientation 720, when a transport speed of the tractor 102 is greater than or equal to the transport speed threshold 512, the designated articulated steering angle 514 is limited to 0° (straight) while the front axle steering system 140 end-of-travel limit has not been reached. As such, the front axle steering system 140 is operated at a front axle steering angle as illustrated in FIG. 7. In right and left transport orientations 710 and 720, respectively, the front axle steering angle is limited to ±7° relative to the vehicle axis VA as illustrated in FIG. 7 as maximum right turn configuration 710 and maximum left turn configuration 720 wherein each of the front wheels 122 is oriented at an angle of 7 degrees relative to the vehicle axis VA. In other types of vehicles the front axle steering stop angle is limited to a higher or lower angle. In either of maximum turning configurations 710 and 720, the path curvature is 0 degrees.

In other forms, the tractor 102 is depicted in a first adjusted rate of orientation 730 or a second adjusted rate of orientation 740 as illustrated in FIG. 7. When the tractor 102 is in either of the first or the second adjusted rate of orientation 730 or 740, the designated speed 510 is between the field speed threshold 516 and the transport speed threshold 512, then the articulated steering system 150 is enabled to operate at the articulation steering angle that is linearly interpolated between an articulation angle limit and zero degrees. Further, the front axle steering system 140 is operated at the front axle steering angle being at a first rate of adjustment and the articulated steering system 150 is operated at the articulation steering angle at a second rate of adjustment, wherein the first and second rate of adjustments may be different. When the tractor 102 is in first adjusted rate of orientation 730, each of the front wheels 122 is oriented at an angle of 7 degrees relative to the vehicle axis VA and each of the rear wheels 132 is oriented at an angle of 5 degrees relative to the vehicle axis VA. When the tractor 102 is in the second adjusted rate of orientation 740, each of the front wheels 122 is oriented at an angle of 7 degrees relative to the vehicle axis VA and each of the rear wheels 132 is oriented at an angle of 5 degrees relative to the vehicle axis VA.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for steering a vehicle, the method comprising:
   operating the vehicle in an automated steering control mode wherein the vehicle includes an articulated steering system, a front axle steering system, a front and rear ground engaging means, and a controller operatively coupled with the articulated steering system and the front axle steering system;
   operating at least one of the front ground engaging means and the rear ground engaging means at a transport speed that is greater than a transport speed threshold, wherein the transport speed threshold is greater than a field speed threshold;
   while the at least one of the front ground engaging means and the rear ground engaging means is being operated at the transport speed, the controller is configured to:
   identify a desired path curvature of the vehicle, and based on the desired path curvature of the vehicle determine a desired steering angle;
   based on the desired path curvature of the vehicle, determine a front axle steering angle of the front axle steering system and command the front axle steering system to operate at the front axle steering angle;
   based on the desired path curvature of the vehicle, determine an articulation steering angle of the articulated steering system and command the articulated steering system to operate at the articulation steering angle; and
   wherein the desired steering angle is less than an articulation steering actuation angle, further limiting operation of the articulated steering system in a fixed configuration.

2. The method of claim 1, further comprising:
   wherein the operating the articulated steering system in the fixed configuration includes a commanded articulation steering angle being zero degrees relative to a vehicle axis of the vehicle.

3. The method of claim 1, further comprising:
   when the front axle steering angle is equal to a front axle steering stop angle, then operating the front axle steering system in a maximum turning configuration.

4. The method of claim 1, further comprising:
   when the front axle steering angle is between the front axle steering stop angle and the articulation steering actuation angle, operating the articulated steering system at the articulation steering angle greater than zero degrees.

5. The method of claim 1, wherein the sum of the front axle steering angle and the articulation steering angle is equal to the desired steering angle.

6. The method of claim 2, further comprising:
   maintaining the articulation steering system in the fixed configuration; and
   operating the front steering system at the front axle steering angle.

7. A method of steering a vehicle, comprising:
   operating the vehicle in an automated steering control mode wherein the vehicle includes an articulated steering system, a front axle steering system, and a controller operatively coupled with the articulated steering system and the front axle steering system;
   commanding the vehicle to operate at a desired path curvature of the vehicle, wherein a desired steering angle is determined from the desired path curvature of the vehicle;
   determining a commanded front axle steering angle from the desired path curvature;
   wherein while the desired steering angle is greater than an articulation steering actuation angle:
   operating the articulated steering system at an articulation steering angle being at least equal to the articulation steering actuation angle;
   operating the front axle steering system at a front axle steering angle that is determined from the desired steering angle and the articulation steering angle; and
   wherein while the commanded front axle steering angle is between a front axle steering stop angle and the articulation steering actuation angle:
   operating the articulated steering system at the articulation steering angle between greater than zero degrees and 1 degree;
   operating the front axle steering system at the front axle steering angle that is determined from the desired steering angle and the articulation steering angle.

8. The method of claim 7, further comprising:
   wherein the vehicle includes front and rear ground engaging means; and operating at least one of the front ground engaging means and the rear ground engaging means at a speed that is between a field speed threshold and a transport speed threshold.

9. The method of claim 7, wherein while the commanded front axle steering angle is equal to a front axle steering stop angle, operating the front axle steering system in a maximum turning configuration.

10. A method of steering a vehicle, comprising:
operating the vehicle in an automated steering control mode wherein the vehicle includes an articulated steering system, a front axle steering system, and a controller operatively coupled with the articulated steering system and the front axle steering system;
commanding the vehicle to operate at a desired path curvature of the vehicle, wherein a desired steering angle is determined from the desired path curvature of the vehicle;
determining a front axle steering angle and an articulation steering angle from the desired path curvature;
operating the front axle steering system at the front axle steering angle;
operating the articulated steering system at the articulation steering angle;
wherein while the desired steering angle is greater than an articulation steering actuation angle, the operating the articulated steering system includes the articulation steering angle being at least equal to the articulation steering actuation angle; and
wherein while the desired steering angle is greater than the combination of a front axle steering stop angle and the articulation steering actuation angle, operating the front steering system at the front axle steering stop angle and operating the articulation steering system at the articulation steering angle that is greater than the articulation steering actuation angle.

11. The method of claim 10, further comprising:
wherein the vehicle includes front and rear ground engaging means; and
operating at least one of the front ground engaging means and the rear ground engaging means at a speed that is less than a field speed threshold.

* * * * *